United States Patent

Franz

[11] Patent Number: 6,004,064
[45] Date of Patent: Dec. 21, 1999

[54] RETROFITTABLE QUICK RELEASE MECHANISM

[76] Inventor: Patrick J. Franz, 1849 SE. 43rd, Portland, Oreg. 97215

[21] Appl. No.: 09/092,742

[22] Filed: Jun. 6, 1998

[51] Int. Cl.[6] .................................................. B60B 27/00
[52] U.S. Cl. ...................................... 403/322.4; 403/374.5; 403/374.1; 301/124.2; 74/551.7
[58] Field of Search ................................ 403/321, 322.4, 403/222.1, 373, 374.1, 374.2, 374.5, DIG. 5; 74/551.3, 551.7, 567, 528; 301/124.2

[56] References Cited

U.S. PATENT DOCUMENTS

| | | |
|---|---|---|
| 2,043,125 | 6/1936 | Stahl . |
| 4,400,038 | 8/1983 | Hosokawa ........................ 301/124.2 X |
| 4,405,180 | 9/1983 | Butz ................................ 301/124.2 X |
| 5,135,330 | 8/1992 | Chen ..................................... 403/374.5 |
| 5,156,508 | 10/1992 | Grisley ..................................... 411/354 |
| 5,362,173 | 11/1994 | Ng ........................................... 403/320 |
| 5,383,716 | 1/1995 | Stewart et al. ....................... 301/124.2 |
| 5,409,321 | 4/1995 | Chen ..................................... 403/321 |
| 5,476,020 | 12/1995 | Garvey et al. ........................ 74/551.1 |
| 5,566,222 | 10/1996 | Chen ..................................... 403/323 |
| 5,653,512 | 8/1997 | Phillips ................................. 301/124.2 |
| 5,673,925 | 10/1997 | Stewart ............................ 301/124.2 X |
| 5,792,046 | 8/1998 | Dobrovolny ..................... 403/374.1 X |
| 5,813,258 | 9/1998 | Cova et al. ...................... 301/124.2 X |

FOREIGN PATENT DOCUMENTS

G08908870 U  11/1989  Germany .

*Primary Examiner*—Lynne Reichard
*Assistant Examiner*—John R. Cottingham

[57] ABSTRACT

A quick release mechanism having a lifting ring (34) and a support ring (30) generally surrounds a shaft to be clamped (20). A cam or other lifting mechanism(32), operated by a handle (42), acts to separate the support ring and the lifting ring in a direction in line with the shaft. A restraint and adjustment nut(40) mounted on the end of the shaft in contact with the lifting ring acts to tension the shaft. The lifting mechanism is free to rotate about the shaft independently of the restraint and adjusting nut allowing the handle to be used in any orientation desired and preventing the handle from being used as a crank or wrench. Embodiments are provided allowing retrofit to existing shaft fastening applications, including those where access to the interior of the shaft must be maintained.

18 Claims, 9 Drawing Sheets

RETROFITTABLE QUICK RELEASE MECHANISM

BACKGROUND

1. Field of Invention

This invention relates to quick release type clamps, specifically to clamps that are easily fitted to existing conventional hardware such as threaded shafts and bolts.

2. Prior Art

When things are fastened together with shaft type fasteners such as ordinary threaded bolts and nuts, it is often desirable to tighten and loosen the fastening means quickly and without tools. In the prior art, various "quick release" type clamps and mechanisms have been used, but these typically require special means to attach to the shaft to be fastened. It is desirable to have a quick release type mechanism which does not require a special shaft or modifications to an existing shaft.

In the prior art, there are quick release mechanisms which do not require special shafts or modifications, but these mechanisms have important limitations. It is common, for instance, for prior art mechanisms to have an undesirable interaction between the radial angle of the operating handle about the axis of the shaft and the adjustment of the clamping range of the mechanism. That is, rotating the operating handle around on the shaft to be clamped or tensioned changes the pretension and clamping range of the quick release. It is desirable to have an operating handle which may be pointed in any direction, independent of the pretension and clamping range of the quick release.

U.S. Pat. No. 5,409,321 to Chan F. Chen (1995), for example, provides a quick releasing mechanism that requires a special "swing" or "latch" type bolt. The quick release mechanism requires a lifting pin which pierces the shaft to be clamped. This cannot ordinarily be done with existing shafts, and inherently links the direction of the operating handle's swing or "throw" to the radial angle of the shaft. For example, if the handle's swing direction or "throw" is changed to avoid an obstacle, the shaft is rotated, changing the pretension adjustment and clamp range of the quick release.

A common variation on the quick release of Chen uses a smooth cylindrical lifting pin piercing the shaft in much the same way as the pin of Chen. However, the pin is used as an axle on which a pair of cams is rotated. The cams are located symmetrically outboard of the shaft and are connected to a handle. When the handle is rotated or "thrown" about the pin, the cams act on the pin to force the end of the shaft outward relative to the surface of the cams. This tensions the shaft, gripping the object to be clamped between the surfaces of the cams and a nut or other means attached to the opposite end of the shaft.

Generally, a quick releasing mechanism with a lifting pin that pierces the shaft requires a pretension adjustment means, usually a threaded nut, be located on an opposite end of the shaft to be clamped. This is often undesirable, as it locates the adjustment means away from the quick release handle. If the shaft passes through a barrier, the opposite end of the shaft may be difficult to reach. This makes adjustment and operation of the quick release difficult.

What is needed is a quick release where the adjustment means is always easily reachable from the operating handle.

If the opposite end of the shaft is unreachable, as in the case of a blind shaft, the pierced shaft type of quick release is unusable unless the shaft is threaded into the blind hole. In this case, adjustment is still possible, but only by rotating the shaft. The resulting throw of the quick release handle is unpredictable and will depend on the pretension required, wear in the mechanism, and other factors that may change over time. What is needed is a quick release where the direction of handle throw is independent of the tension adjustment and inherent wear factors.

The pierced shaft type of quick release also has an undesirable second mode of use. People attempting to operate the quick release without understanding how it works may use the handle to simply turn the shaft, as if the handle were a short wrench. This produces a tightening action via the adjustment threads, but it is often insufficient to adequately tension the shaft. When the device to which the quick release is attached is used, the shaft may come loose. In the case of a wheel on a bicycle, for example, the results may be disastrous. What is needed is a quick release that cannot be improperly used as a crank.

Finally, quick release mechanisms of the pierced shaft type inherently block the end of the shaft to be clamped. This makes them unusable when access through the end of the shaft is required. For example, many internally geared bicycle hubs have hollow axles with shift chains or rods passing from the end of the shaft axially down into the shaft. The special end on the shaft shown in Chen would block the passage of any shift chains or rods. Even if the end of the shaft were modified, the pin piercing the shaft would block access through the center of the shaft. What is needed is a quick release that does not block access to the interior of the shaft along the axis of the shaft.

U.S. Pat. No. 5,556,222 to Chun-Hsung Chen (1996) and U.S. Pat. No. 5,156,508 to Grisley (1992) are representative of a class of quick release mechanisms where a lifting block or rod with opposed spindles is threadably attached to a shaft to be fastened. The shaft passes through the lifting block, and a pair of cams is mounted on the spindles symmetrically outboard of the shaft. The cams are connected to an operating handle. When the handle is rotated or "Trown" about the spindles, the cams act on the lifting block and force the end of the shaft outward relative to the surface of the cams. This tensions the shaft, gripping the object to be clamped between the surfaces of the cams and a nut or other means attached to the opposite end of the shaft.

Quick releases with a lifting block threadably attached to the shaft inherently link the pretension or clamp range to the direction of the operating handle's swing or "Throw". For example, if the handle's swing direction or throw is changed to avoid an obstacle, the lifting block is rotated relative to the shaft, changing the pretension and clamp range of the quick release. What is needed is a quick release where the throw and the tension adjustment are completely independent.

U.S. Pat. No. 5,156,508 to Grisley attempts to overcome this limitation by providing a variable thickness thrust plate which can be inserted between the cams and the object to be clamped. This reduces but does not eliminate the problem. What is needed is a quick release where all tension adjustment can be performed without shims.

Quick releases with a threadably attached lifting block also have the undesirable second mode of use as wrench or crank.

U.S. Pat. No. 2,043,125 to Stahl (1936) describes a quick release where an adjusting nut may be operated without interfering with the operation of the cam operated lifting means. A trunnion block with opposed trunnions is placed over a threaded shaft, followed by an adjusting nut. The clamp may be adjusted without having to move the handle.

The clamp of Stahl requires a washer which is not attached to the rest of the mechanism, creating an opportunity for the washer to be lost or be installed incorrectly. What is needed is a quick release which is self contained, and does not have parts to be lost or assembled incorrectly.

U.S. Pat. No. 5,476,020 to Garvey et al describes a cam operated quick release mechanism with a pair of coaxial inwardly pointing cam pins. The cam pins act to spread the distance between a pair of washers stacked on a bolt. The washers act outwards to clamp an object onto the bolt between a fixed end of the bolt and a threaded nut at the opposite end of the bolt.

The quick release of Garvey et al (1995) overcomes the problem of linking handle throw with pretension and clamp range. The handle may be rotated around the shaft without changing the tension adjustment. While solving this problem, the cam arrangement of Garvey limits the functional rotation of the handle to 90 degrees. This limits the net effective leverage of the mechanism to half that of a cam that operates through 180 degrees or more. What is needed is a quick release that uses more of the available throw room to reduce the forces required on the handle for a given clamp force.

Also, in the quick release of Garvey et al, rotating the operating handle radially about the shaft to be clamped will cause the cams to ride up on the cam tracks in the washers, separating the washers and creating drag on the handle. What is needed is a quick release where the handle can be rotated freely.

Additionally, the only thing keeping the cam pins of Garvey from spreading apart is the stiffness of the handle arms. If the handle must swing over a protruding end of the bolt, the arms must be elongated, making it difficult to provide the necessary lateral stiffness. What is needed is a quick release which provides positive retainment of the cams.

The quick release of Garvey also consists of three separate pieces that must be aligned before use. This is inconvenient and parts may be lost or misplaced when disassembled.

What is needed is a quick release that is self contained and permanently aligned, ready for use.

German Utility Model G08908870.0 (1989) describes a self contained quick release similar in operation to the quick release of Garvey. A pair of inward facing cam pins acts to separate a pair of washers. An integral nut with a raised tower is made part of the mechanism. The mechanism is intended for use with internally geared hubs on bicycles. The nut is adapted for passage of a shift chain through the interior of the mechanism.

This quick release solves many problems with prior art quick releases, but has several limitations. The handle operates over a comparatively small range of movement, reducing leverage and limiting the amount the clamp opens and closes. This makes the clamp adjustment very sensitive and the adjustment nut may have to be loosened to get enough clearance to remove the bicycle wheel from the bicycle. What is needed is a quick release with increased leverage and a larger clamping range.

Also, the width of the ends of the handle arms where the cams are formed is necessarily wide. This may interfere with existing objects in the vicinity of the quick release. The location of the pivot point of the handle is also very low, requiring the handle to lay close to the surface to be clamped. This again may interfere with objects in the vicinity. What is needed is a narrower quick release which allows the handle to avoid hitting objects in the vicinity.

OBJECTS AND ADVANTAGES

Several objects and advantages of the present invention are:

(a) Easily retrofittable onto existing hardware—simply stack onto existing bolt or shaft to convert to quick release fastening.

(b) The throw of the operating handle is independent of tension and clamp range adjustment. The handle may be rotated to any desired position without the need to readjust the clamping range.

(c) Due to (b), the throw of operating handle may be freely changed to avoid obstacles.

(d) The operating handle rotates freely around shaft without dragging or binding.

(e) The mechanism does not interfere with other uses for the interior of the clamped shaft. Shift mechanisms or other uses of the inside of the shaft are unaffected.

(f) The operating range of handle can be 180 degrees or more for improved leverage and lower required operator effort.

(g) The operating range of the handle can be 180 degrees or more for increased range of clamping movement.

(h) The tension and clamping range adjustment is on same side of the surface to be clamped as the operating handle, ensuring the adjustment is easy to reach.

(i) All parts of the mechanism can be positively retained, increasing the strength and reliability of the quick release.

(j) The parts of the mechanism are interconnected together so there are no separate pieces to lose, install incorrectly, or misalign.

(k) The quick release may be clamped over gaps in the clamped surface. For example, axle dropout slots in a bicycle wheel application.

(l) The quick release can be made to have a low profile, to work with short shaft extensions or in applications where a low profile is needed.

(m) Depending on the application, the quick release may be adapted for short shaft extensions by either a low profile or an extended profile design.

(n) The quick release may be used in applications where there are obstacles near the shaft to be clamped because the quick release has a narrow profile, especially down low where the quick release contacts the surface to be clamped.

(o) Safety is improved because the handle cannot be improperly used as wrench or crank.

Further objects include ease of manufacture, use with both short and long shaft extensions, providing both cam and over center linkage designs as well as working with threaded or other shafts. A final object is providing good surfaces on which to put marking and labeling.

DRAWING FIGURES

FIG, 9 shows an over center latch form of the quick release.

SUMMARY

In accordance with the present invention, a quick release clamp comprises a lifting ring, a support ring, a lifting means, and a retaining means. The lifting ring has a central clearance bore for slidably fitting over a shaft to be clamped or tensioned. The support ring, lifting ring, and retaining means are stacked on the shaft to be clamped. The support ring acts against a surface to be clamped. The retaining means is formed to transfer axial forces from the lifting ring to the shaft. The lifting means acts between the support ring and the lifting ring. When a handle is operated, the lifting means acts to separate the support and lifting rings in a direction along the axis of the shaft. The support ring presses onto the surface to be clamped, and the lifting ring presses onto the retaining means, thus tensioning the shaft and clamping the surface to be clamped.

Figure 1:
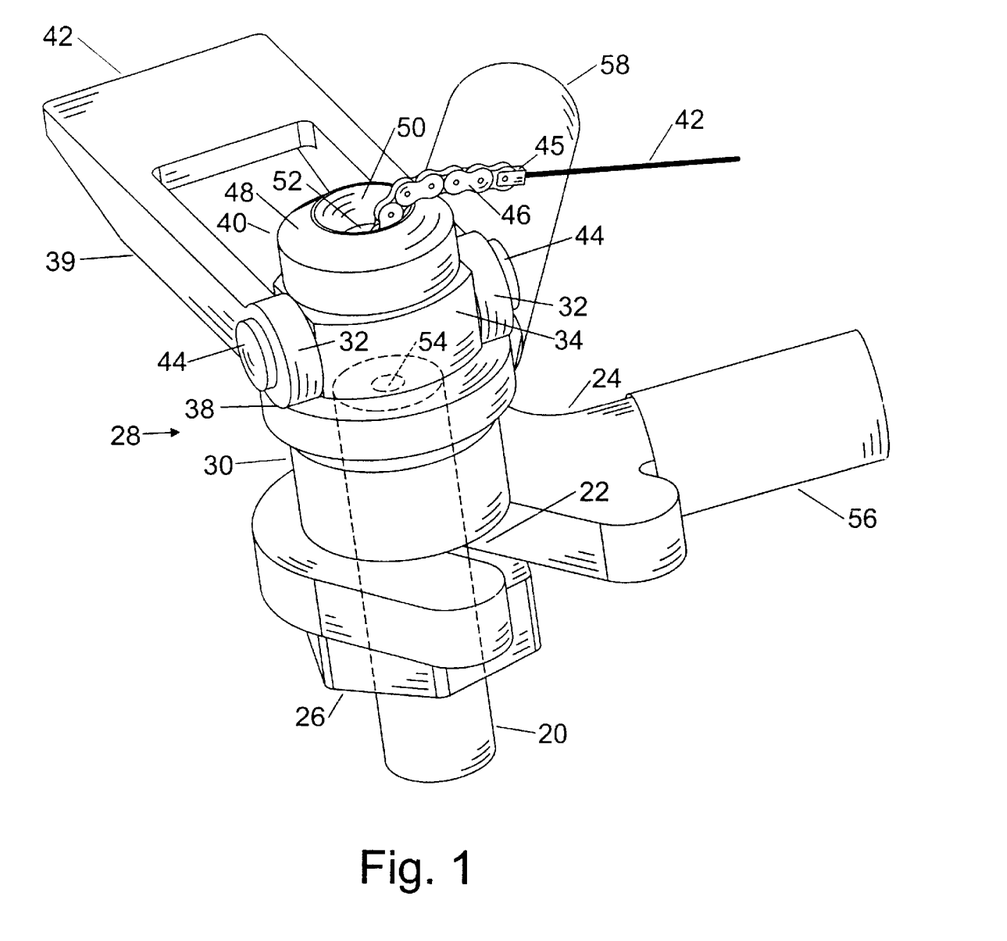
FIG. 1 shows a narrow, extended profile quick release in a bicycle application showing an axially operating shift chain and a clamped surface with a gap.

Description—FIG. 1

FIG. 1 illustrates an embodiment of the present invention suitable for use in internally geared bicycle hub fastening applications. An axle shaft 20 extends upwards through a nut 26, through a slot 22 in a dropout plate 24, and into a quick release 28. For visualization purposes, portions of a bicycle chainstay tube 56 and a seatstay tube 58 are shown connected to dropout plate 24. Nut 26 is threaded onto shaft 20 below plate 24. Quick release mechanism 28 is threaded onto the portion of shaft 20 extending above plate 24. Axle shaft 20 is sized to slide freely in slot 22.

A generally cylindrical hollow support ring 30 has its bottom surface in contact with the upper surface of dropout plate 24. On a top surface of support ring 30, a pair of cam follower grooves 38 support a lifting means comprising a pair of cams 32. A pair of arms 39 connect cams 32 to a handle 42. Cams 32 pivot about a pair of horizontally opposed spindle pins 44 extending from a lifting ring or block 34.

A retaining/adjusting ring 40 has an outer beveled surface 48. A shift cable 42 pulls on a removable clip 45 attached to a shift chain 46. Shift chain 46 slides over outer beveled surface 48 of retaining ring 40, down an inner beveled throat 50, and down through a hole 52. A hole 54 extends down into axle shaft 20 and is used to connect an internally geared hub mechanism with the shift chain 46.

Figure 2:
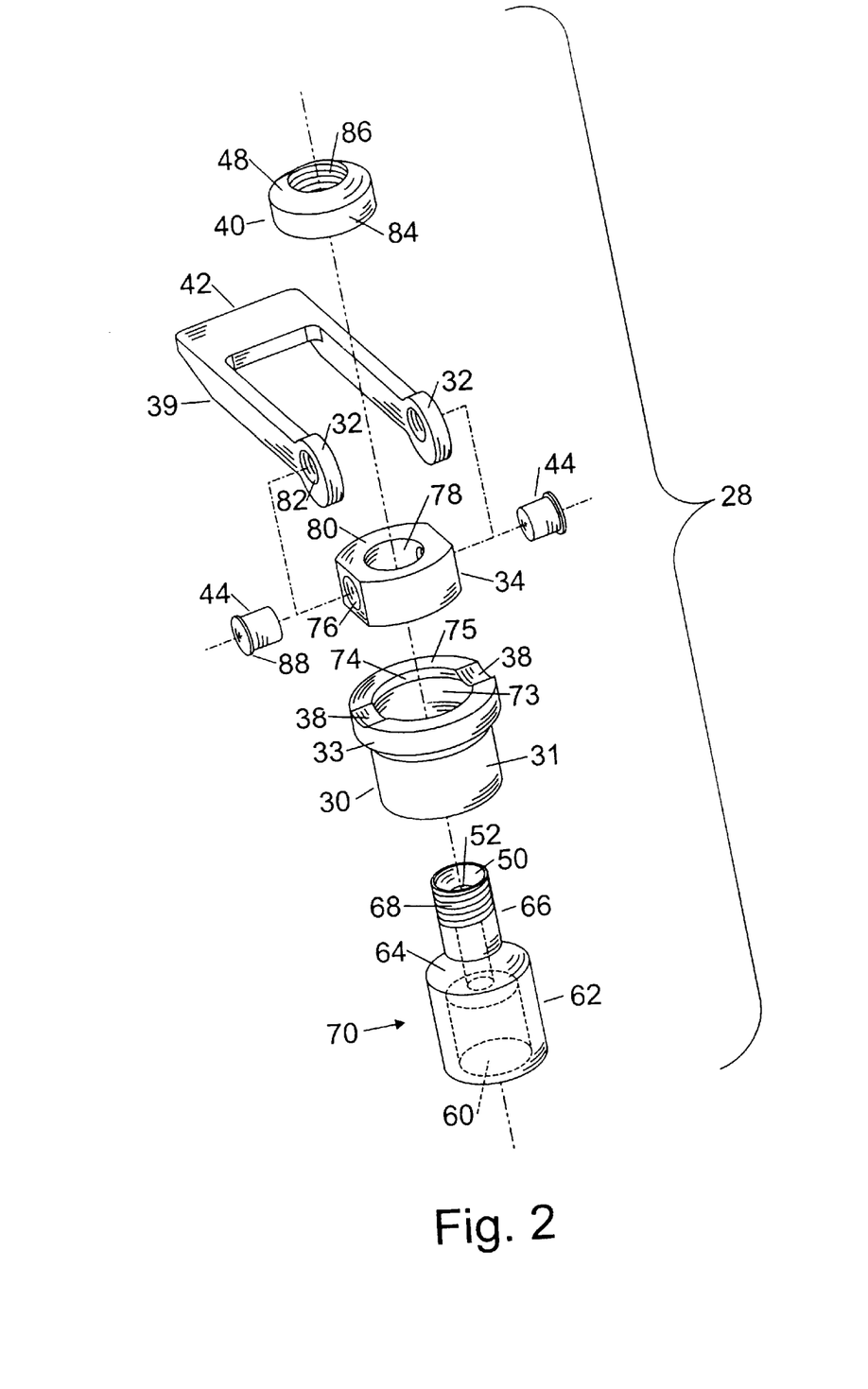
FIG. 2 is an exploded perspective view of the quick release of FIG. 1.

Description—FIG. 2

FIG. 2 shows an exploded view of quick release mechanism 28 of FIG. 1. Starting from the bottom and working upwards, the drawing shows a carrier/extender 70 with an enlarged lower portion 62 having a central threaded bore 60 for receiving an axle or other shaft to be clamped. A shoulder 64 connects a tower portion 66 to lower portion 62. The top portion 68 of tower 66 is externally threaded. Hole 52 extends from the threaded bore 60 upwards and merges into internally beveled throat 50. Hole 52 is sized to allow passage of shift chain 46, shown in FIG. 1.

Support ring 30 has an inner bore 73 sized to fit slideably over the lower portion 62 of carrier 70. A top surface 75 of support ring 30 has a smaller inner diameter than inner bore 73, forming a retaining lip 74. When assembled, shoulder 64 contacts the underside of retaining lip 74, preventing carrier 70 from passing all the way through ring 30. When shoulder 64 contacts the underside of retaining lip 74, the bottom surface of carrier 70 is slightly higher than the bottom surface of support ring 30.

Support ring 30 has a lower portion 31 with a diameter less than that of an upper portion 33. This allows for a reduction in the weight of ring 30 as well as making the lower portion 31 narrower and more easily able to clear obstructions as the bicycle wheel is removed and reinstalled onto the bicycle.

The top surface 75 of ring 30 has cam follower grooves 38 for receiving cams 32. Cams 32 each have a pivot hole 82. Lifting ring 34 has a pair of horizontally opposed holes 76 for receiving pins 44. Pins 44 pass slideably through pivot holes 82. Cams 32 are connected via arms 39 to handle 42. Pins 44 are press or shrink fit into holes 76 in lifting ring 34. Pins 44 each have a shoulder 88 to prevent cams 32 from sliding outwards.

Lifting ring 34 has a central clearance bore 78 sized to clear the tower portion 66 of carrier 70. To prevent withdrawal of pins 44, a head may be formed on pins 44 inside bore 78 after the pins have been inserted through holes 76. A top surface 80 of ring 34 bears on the underside of retaining/adjusting ring 40.

Retaining/adjusting ring 40 has an outer surface 84 for gripping and beveled surface 48 for slideable passage of shift chain 46. Outer surface 84 is typically knurled, but may have wrench flats or other means for turning. A central threaded bore 86 is sized to receive threaded portion 68 of carrier 70.

Once assembled, the mechanism is set up as follows: handle 42 is pivoted to place cams 32 at their point of maximum lift. Retaining/adjustment ring 40 is adjusted relative to carrier 70 such that shoulder 64 is almost makes contact with retaining lip 74. Thread locking compound or other means are then used to prevent further relative movement of adjusting ring 40 and carrier 70.

This setup step ensures that the quick release mechanism 28 remains together as a unit and provides for simple operation. Since the adjustment ring 40 and carrier 70 are permanently joined, outer gripping surface 84 may be used to thread inner bore 60 onto the shaft to be clamped. The threads on inner bore 60 are used for adjustment of the pretension and clamp range of the quick release.

Obviously, means other than threads and locking compound may be used to secure ring 40 to carrier 70. Examples of other appropriate securing means would be set screws, press or shrink fits, gluing, and welding.

The parts of the quick release mechanism shown in FIGS. 1 and 2 may be made of any material of the required strength. Metals such as steels are preferred, but other materials may be used. The walls of lifting ring 34 must be particularly able to handle the shear forces produced by pins 44. Appropriate materials or coatings must be selected for the surfaces of cams 32 and cam follower grooves 38 to provide long life and reduce friction.

The cams may be any appropriate cam type, including spiral, offset circular, arctuate, and logarithmic. A progressive spiral cam with faster initial lift and a slight relaxation after maximum lift is preferred. This allows slack to be taken up quickly and for the user to feel the handle "lock" into the clamped position.

Alternative embodiments include forming integral spindles on ring 34, eliminating cam follower grooves or retaining ring on support ring 30, and providing different handle means to rotate cams 32. For example, the handle could be in the form of a U shaped wire bail with its arms press fit into separate cam plates. Of course, relative dimensions of the components can be changed for different stack-ups. Also, cams may be formed on the pins instead of the ends of the handle arms without changing the essential invention.

Operation—FIGS. 1 and 2

Quick release 28 operates as follows: shift chain 46 is inserted up through threaded bore 60 and hole 52. Inner bore 60 is then threaded onto shaft 20 using adjustment ring 40. Handle 42 is then pivoted about pins 44 to the open or minimum lift position of cams 32 and positioned radially about shaft 20 for the desired throw direction. On a bicycle, there are typically obstacles to be avoided such as derailleurs, so the ability to control where the handle winds up is important.

A final adjustment is made to adjustment ring 40 and handle 42 is then pivoted about pins 44 to the closed or clamped position, causing cams 32 to push down on support ring 30. Pins 44 transmit upwards reaction force from cams 32 to lifting ring 34. Ring 34 slides up on tower 66 and pushes upwards on the underside of adjusting ring 40. Adjusting ring 40 is threadably connected to carrier 70, which pulls upwards on shaft 20. Nut 26 on shaft 20 below dropout plate 24 is pulled into pressing contact with the bottom surface of dropout 24. Support ring 30 presses on the top surface of dropout 24 due to the downward force of cams 32. Dropout plate 24 is thereby clamped between nut 26 and support ring 30.

Once dropout 24 is clamped, shift cable 46 may be reconnected to shift cable 42 using clip 45.

As shown in the embodiment of FIGS. 1 and 2, improvements over the prior art include:

(a) Convenient operation—self contained mechanism 28 is simply threaded on and clamped.

(b) Passage is provided for a shift chain 46 or other uses of the interior of the shaft.

(c) Beveled surfaces 48 and 50 are provided for sidable passage of a shift chain or other gear shifting means.

(d) Operating handle 42 may be easily rotated around on the shaft to any desired position.

(e) Due to its height, support ring 30 is easily made strong enough to clamp over gap 22 in dropout 24 without deforming regardless of the position of cams 32 relative to slot 22.

(f) Adjustment ring 40 is easily accessible at all times.

(g) The throw of handle 42 is easily made 180 degrees or more for increased leverage and increased lift of cams 32. Increased lift means the unclamped looseness of the quick release can be greater, enabling easier removal of axle 20 from dropout 24.

(h) Since shaft 20 does not need to pass through the mechanism quick release 28 may be used where only a short amount of shaft 20 protrudes above dropout 24.

(i) Since the cams are located higher than the end of axle 20, the diameter of tower 66 may be less than that of axle 20, making the overall mechanism narrower. Also, lower portion 31 of support ring 30 is narrower than the cams, making it easier to clear obstacles mounted on dropout plate 24. Having the handle higher also makes it easier to clear obstacles on plate 24.

(j) Outer surface of support ring 30 and grasping portion of handle 42 are well suited for marking or labeling.

(k) The operating handle cannot be improperly used as a wrench or crank to tighten the quick release.

Figure 3:
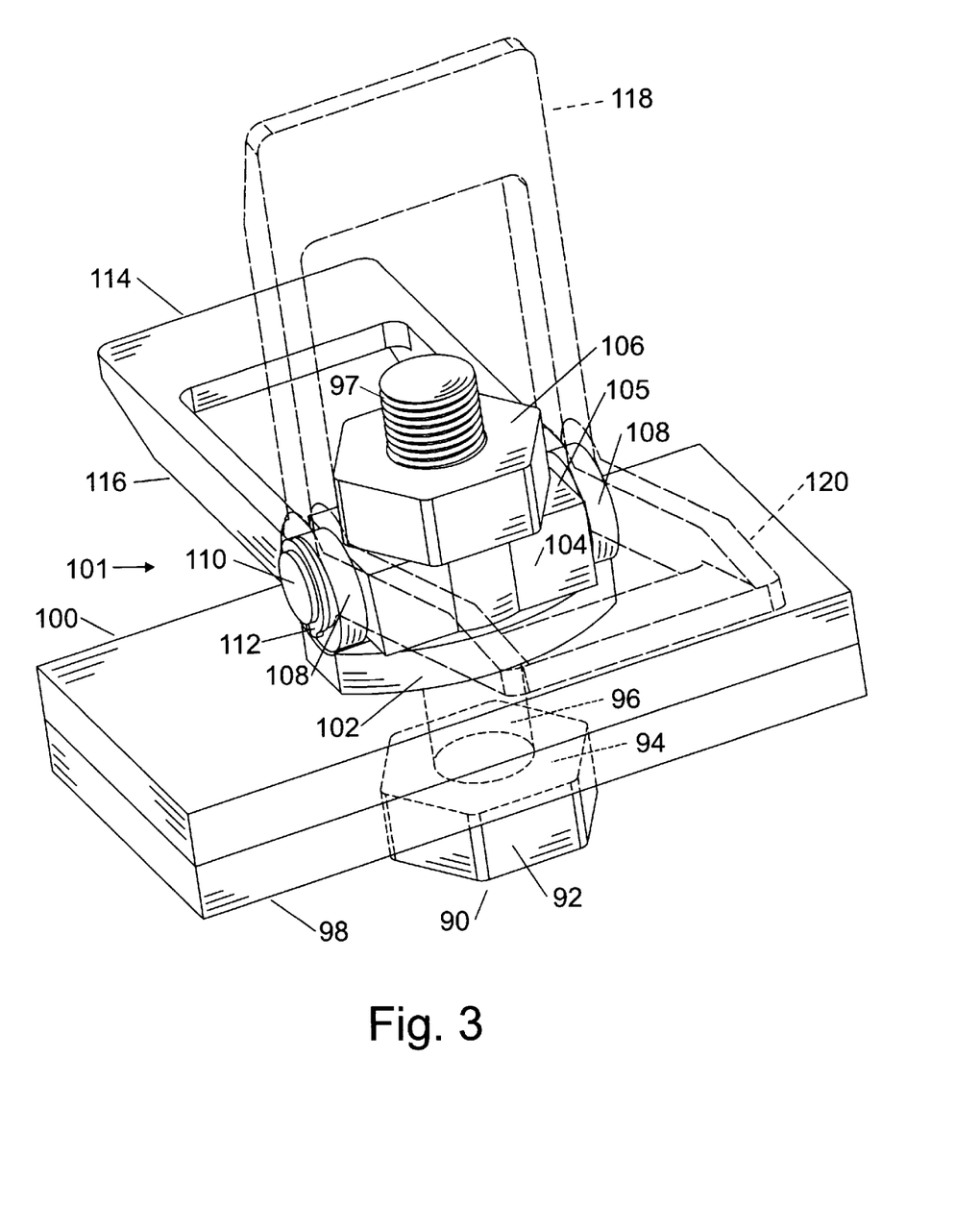
FIG. 3 shows a simplified quick release with an operating handle in 3 different positions.

Description—FIG. 3

FIG. 3 shows an alternate embodiment of a quick release in combination with a shaft and articles to be clamped. A quick release mechanism 101 is shown combined with a bolt 90 and a pair of plates to be clamped 98 and 100. Plates 98 and 100 are intended to be a simple representation of possible things to be clamped by the quick release; obviously there are many other possibilities.

From bottom to top, bolt 90 with a shaft 96 passes through plates to be clamped 98 and 100, through a support plate or ring 102, a lifting ring or block 104, and is threadably engaged through a nut 106. Bolt 90 has a head 92 with a clamping face 94 in contact with the bottom surface of plate 98. Bolt 90 is intended as a simple representation of possible arrangements of shafts to be clamped.

A pair of cams 108 are pivotally attached to a pair of spindles 110 and retained on the spindles by a pair of clips 112. Cams 108 are connected to a handle 114 by a pair of arms 116. Spindles 110 are integrally formed with a lifting block 104. Lifting block 104 has an upper surface 105 in contact with the bottom surface of nut 106.

Handle 114 pivots about spindles 110. Handle 114 is shown in the fully clamped position. Handle 118 shown in dashed outline indicates the midpoint of handle throw. Handle 120 also shown in dashed outline, indicates the handle near the open or unclamped position. The handles in the other embodiments shown in the other figures operate in a similar manner.

Nut 106 is sized and cams 108 are spaced at such a distance that nut 106 can rotate about shaft 96 on a threaded portion 97 of shaft 96 without nut 106 contacting cams 108 or handle arms 116. Arms 116 are selected to be of such a length that handle 114 does not contact the upper end of bolt shaft 96 when handle 114 is pivoted about spindles 110.

Figure 4:
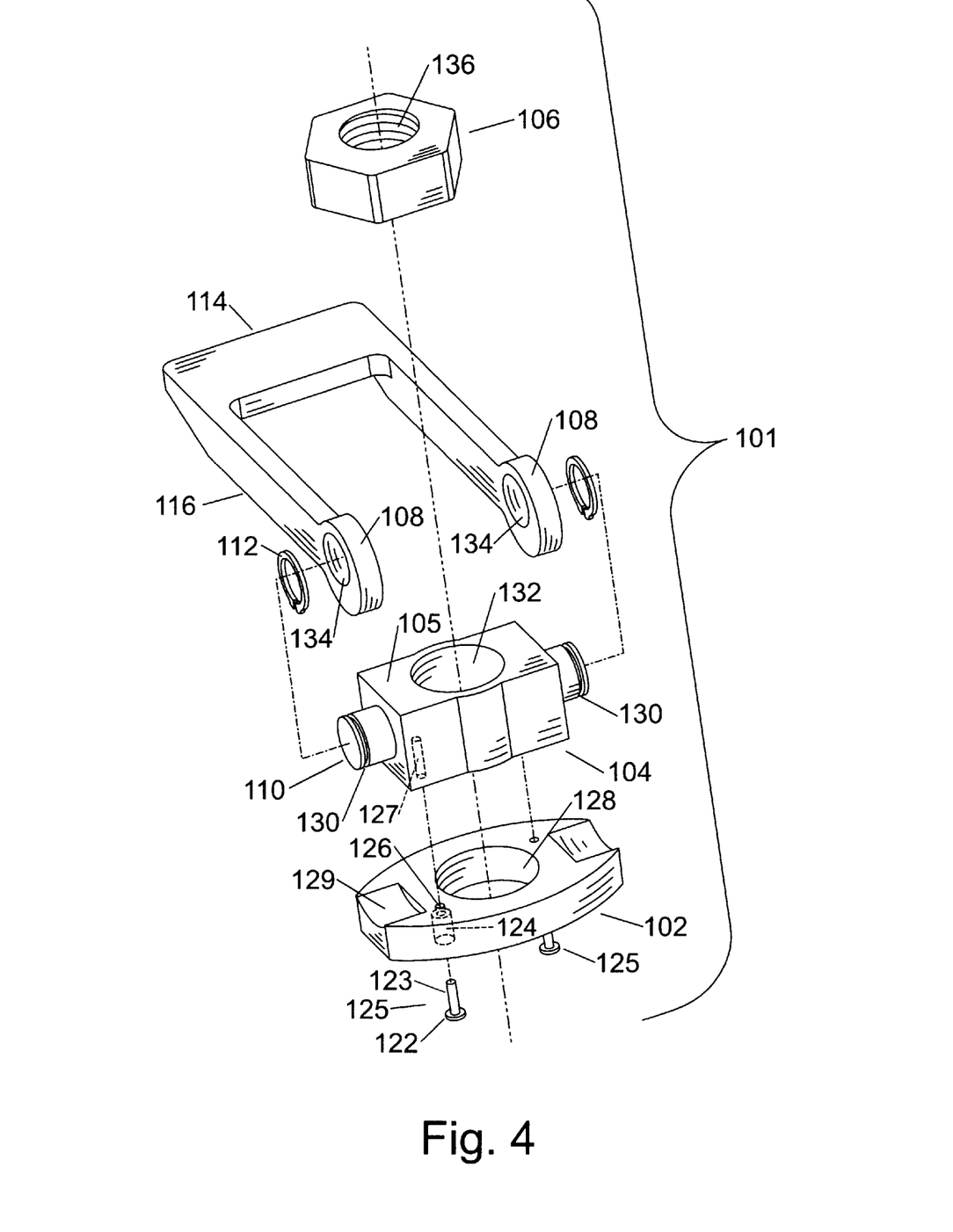
FIG. 4 shows an exploded perspective view of the quick release of FIG. 3.

Description—FIG. 4

FIG. 4 shows quick release 101 from FIG. 3 in an exploded view. Support plate 102 has a central clearance bore 128, a pair of symmetrically located cam follower grooves 129, and a pair of symmetrically located cylindrical retaining chambers 124. A pair of retainer screws or pins 125 each having a head 122 and a shaft 123 are each slideably received in chambers 124 on the underside of plate 102. A symmetrically located pair of holes 126 allows shafts 123 clearance through plate 102. Lifting block 104 has a corresponding pair of holes 127 for securely receiving shafts 123. Heads 122 are retained by the tops of chambers 124 and prevented from passing through plate 102.

Lifting block 104 has a central clearance bore 132 and horizontally opposed spindles 110, each with a groove 130. Cams 108 each have a pivot hole 134 slideably fitted onto a spindle 110. Cams 108 are retained by clips 112 fitted into grooves 130.

Cams 108 are attached via arms 116 to handle 114. Nut 106 has an inner threaded bore 136 for threadably receiving a shaft to be clamped or tensioned.

Clearance bores 128 and 132 are sized to allow a loose clearance fit over the shaft to be clamped.

The parts of the quick release mechanism shown in FIGS. 3 and 4 may be made of any material of the required strength. Metals such as steels are preferred, but other materials may be used. Appropriate materials or coatings must be selected for the surfaces of cams 108 and cam follower grooves 129 to provide long life and reduce friction.

The cams may be any appropriate cam type, including spiral, offset circular, arctuate, and logarithmic. A progressive spiral cam with faster initial lift and a slight relaxation after maximum lift is preferred. This allows slack to be taken up quickly and for the user to feel the handle "lock" into the clamped position.

Alternative embodiments include forming spindles 110 as separate insertable pins, eliminating cam follower grooves 129 on support plate 102, and providing different handle means to rotate cams 108. Wings extending up from plate 102 may also be used to capture block 104 and create a self contained unit. Also, cams may be formed on the pins instead of the ends of the handle arms without changing the essential invention.

Nut 106 is the adjustment and restraining means of the quick release. If shaft 96 was not threaded, an alternative embodiment of the adjustment and restraint means could consist of two cooperating parts. The first part would attach to the shaft to be clamped, and the second part would be threadably attached to the first part. In this way, a convenient means of adjustment could be maintained even though the shaft itself was not threaded.

Operation—FIGS. 3 and 4

Quick release 101 operates as follows: quick release 101 is inserted over shaft to be clamped 96. Handle 114 pivoted to the open position and nut 106 is threaded onto the shaft into contact with, or nearly in contact with upper surface 105 of lifting block 104. Handle 114 is rotated about the shaft to the desired starting direction and is then thrown or pivoted about spindles 110, rotating cams 108. Cams 108 are received in cam follower grooves 129 and push support plate 102 down onto the top surface of plate to be clamped 100.

Cams 108 lift block 104, causing upper surface 105 to push nut 106 and therefore shaft 96 upwards. This pulls clamping face 94 of bolt 90 into increasing contact with the bottom surface of plate to be clamped 98, squeezing and clamping plates 98 and 100.

As quick release 101 is operated, retaining pins slide up and down inside chambers 124. Retaining pins 125 are installed so that when handle 114 is in the clamped position, heads 122 of pins 125 touch or nearly touch the top surface of chambers 124. Chambers 124 are deeper than the lift of cams 108 plus the thickness of heads 122. This ensures that when the clamp is releases, heads 122 will not extend out beyond the bottom surface of plate 102.

Improvements over the prior art shown in the embodiment of FIGS. 3 and 4 include:
 (a) Convenient operation—self contained quick release mechanism 101 is simply inserted on shaft, nut 106 is threaded on, and handle 114 is used to clamp the connection tightly.
 (b) To convert a previously nutted connection to a quick release connection, nut 106 is simply removed, quick release 101 inserted on the shaft, and nut 106 reinstalled.
 (c) Long lengths of bolt shaft 96 protruding from plate to be clamped 100 may be accommodated by selecting the length of handle arms 116.
 (d) Handle 114 may be freely rotated around shaft to be clamped without affecting adjustment.
 (e) Cams 108 are positively retained on spindles 110.
 (f) Handle 114 cannot be used a wrench or handle to attempt to tighten nut 106.
 (g) Handle 114 may be pivoted 180 degrees or more, increasing leverage and allowing cams 108 to open wider.
 (h) Adjusting means 106 is easily reachable at all times.
 (i) Outer surface of lifting block 104 is well suited for marking or labeling.

Figure 5:
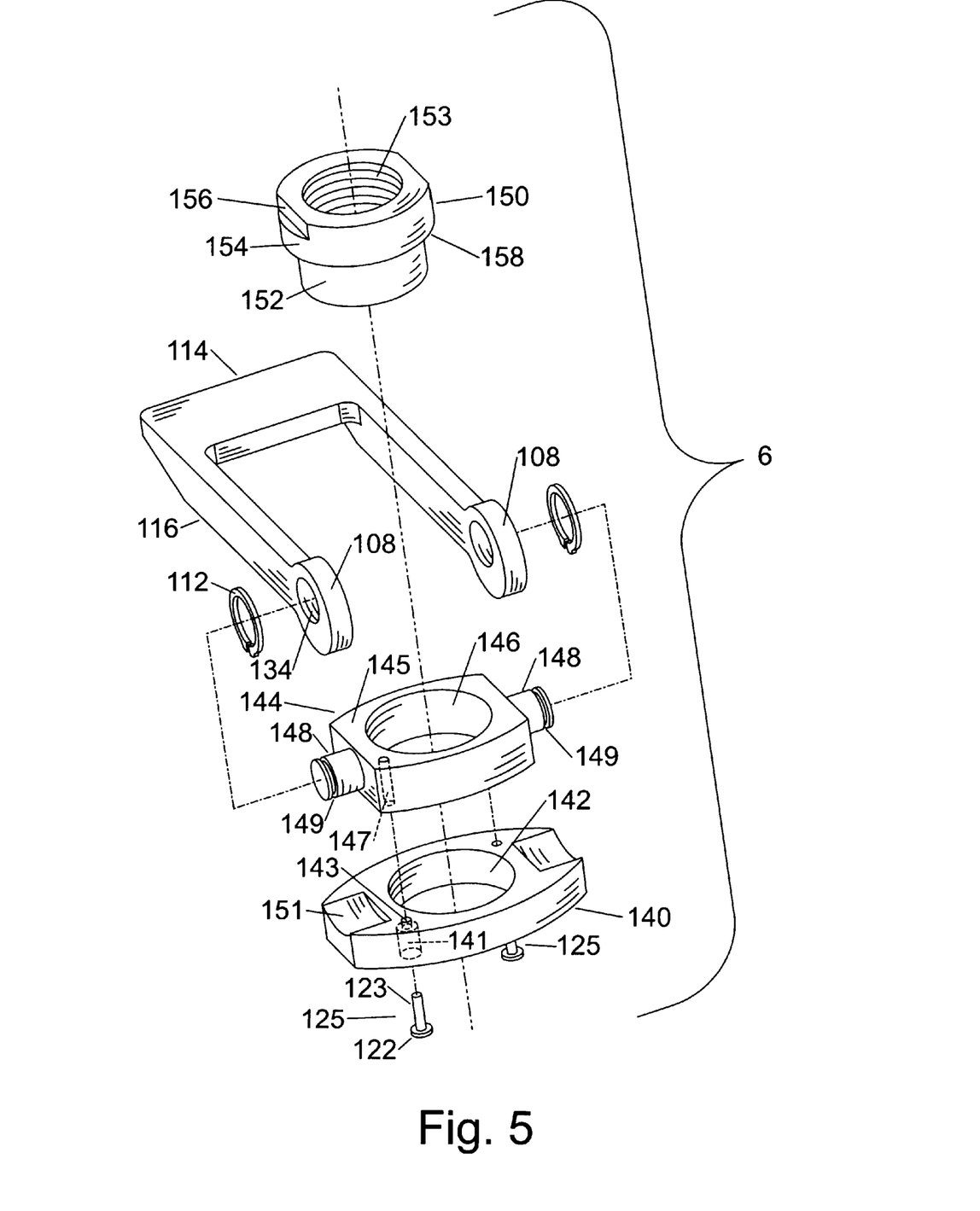
FIG. 5 shows an exploded perspective view of a low profile quick release.

Description—FIG. 5

Figure 6:
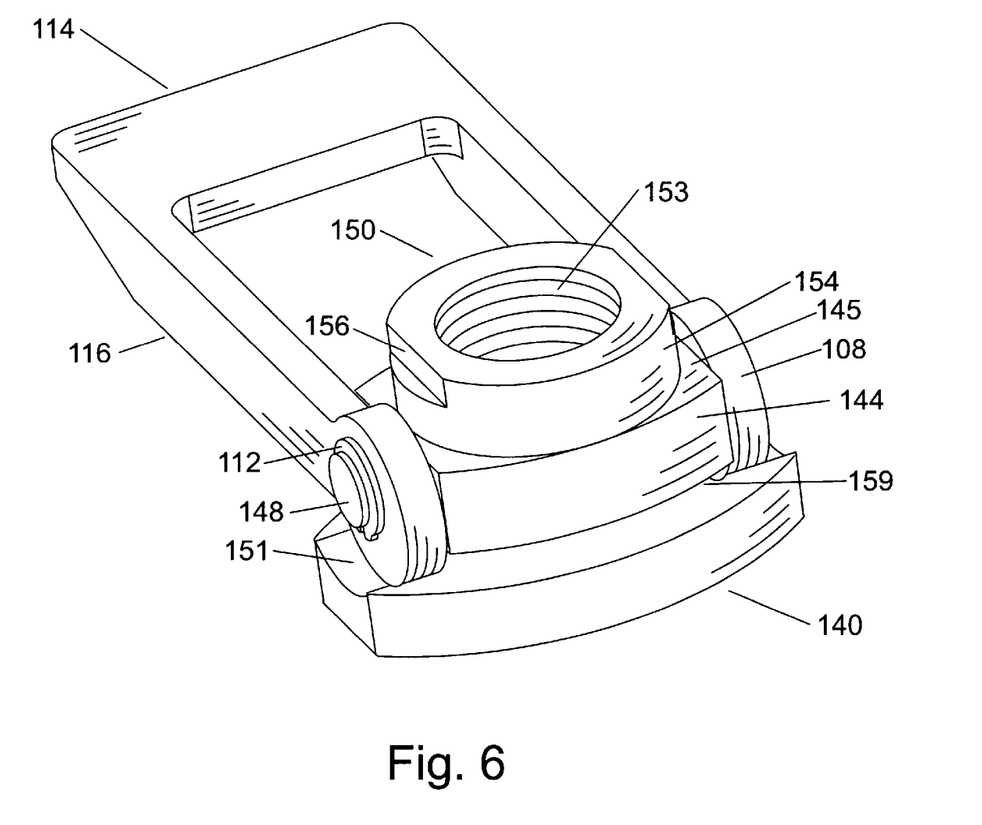
FIG. 6 shows an assembled view of the quick release of FIG. 5.

FIG. 5 shows an exploded view of a third embodiment of the retrofittable quick release. The quick release of FIGS. 5 and 6 is similar in operation to the quick release of FIGS. 3 and 4, with special modifications to allow a lower profile and to work with shorter shaft extensions.

A support plate 140 has an enlarged central clearance bore 142 and a pair of symmetrically located cam follower grooves 151. Plate 140 further has a pair of symmetrically located clearance holes 143 connected to a pair of retaining chambers 141. A pair of retainer screws or pins 125 each with a head 122 and a shaft 123 are received in chambers 141 on the underside of plate 140. A lifting block 144 has a pair of holes 147 corresponding to holes 143. Shafts 123 pass slideably through holes 143 and are securely received in holes 147. Heads 122 are retained by the top surface of chambers 141.

Lifting block 144 has an enlarged central clearance bore 146 and a pair of horizontally opposed spindles 148. Cams 108 each with pivot hole 134 are slideably fitted onto spindles 148 via pivot holes 134. Each spindle 148 has a groove 149. Cams 108 are retained on spindles 148 by clips 112 fitted into grooves 149. Cams 108 are connected to handle 144 by arms 116.

A special nut 150 has an inner threaded bore 153 for threadably receiving a shaft to be clamped or tensioned. Nut 150 has a lower depending portion 152 sized to fit through bore 146 in lifting block 144 and bore. 142 in support plate 140. An upper portion 154 of nut 150 is of a larger diameter than lower portion 152, creating a shoulder 158. A top surface 145 of lifting block 144 contacts the underside of shoulder 158 on nut 150. Upper portion 154 may optionally have a set of wrench flats 156 or be knurled for ease of gripping.

Description—FIG. 6

FIG. 6 shows the embodiment of FIG. 5 in assembled form. Nut 150 with threaded bore 153 is inserted through lifting block 144 and support plate 140. Shoulder of nut 150 rests on upper surface 145 of lifting block 144, leaving only upper portion 154 of nut 150 showing. Lifting block 144 has horizontally opposed extending spindles 148 on which cams 108 are pivotably mounted. Cams 108 are retained onto spindles 148 by clips 112. Cams 108 are connected to handle 114 by arms 116. Nut 150 has wrench flats 156.

Support plate 140 has cam follower grooves 151 for receiving cams 108. Handle 114 is shown in the fully clamped position, lifting block 144 above plate 140 leaving a gap 159.

Preferred materials and shapes of cams are as described previously for FIGS. 1 through 4. Bore 146 in lifting block 144 and bore 142 in support block 140 are sized for a loose clearance fit to lower portion 152 of nut 150.

Alternative embodiments include eliminating support plate 140 to create an even lower profile. Also, a groove could be added around the bottom of depending lower portion 152 and a retaining lip added to the top of bore 142. This would allow a C clip in the groove to hold all the parts together as a self contained unit, similar to shoulder 64 and lip 74 in the quick release of FIGS. 1 and 2.

Operation—FIGS. 5 and 6

The quick release of FIGS. 5 and 6 operates in a similar manner to the quick release of FIGS. 3 and 4 with the important difference that lower portion 152 of nut 150 is slipped through lifting block 144 and support plate 140, then threaded onto the shaft to be clamped. This allows the quick release to be used with very short shaft extensions.

Pivoting the handle 114 about spindles 148 causes cams 108 to increase the separation between support plate 140 and lifting block 144. This causes upper surface 145 of lifting block to bear on lower surface of shoulder 158 on nut 150. Nut 150 is threadably engaged with a shaft to be clamped, so upward movement of nut 150 tensions the shaft and clamps whatever needs to be clamped in a manner similar to the quick releases of FIGS. 1 through 4.

The quick release of FIGS. 5 and 6 retains all the advantages of the embodiment of FIGS. 3 and 4. Improvements over embodiment of FIGS. 3 and 4 include:

(a) Very short shaft extensions can be accommodated, since nut 150 reaches down to the bottom of support plate 140, which is resting on the surface to be clamped.

(b) Very low profiles can be created, since no thread engagement is required above upper surface 145. Height of upper portion 154 may be very short.

(c) Upper portion 154 of nut 150 may be extended and the interior shaped to provide a beveled throat for passage of a shift chain, similar to the quick release of FIGS. 1 and 2.

Figure 7:
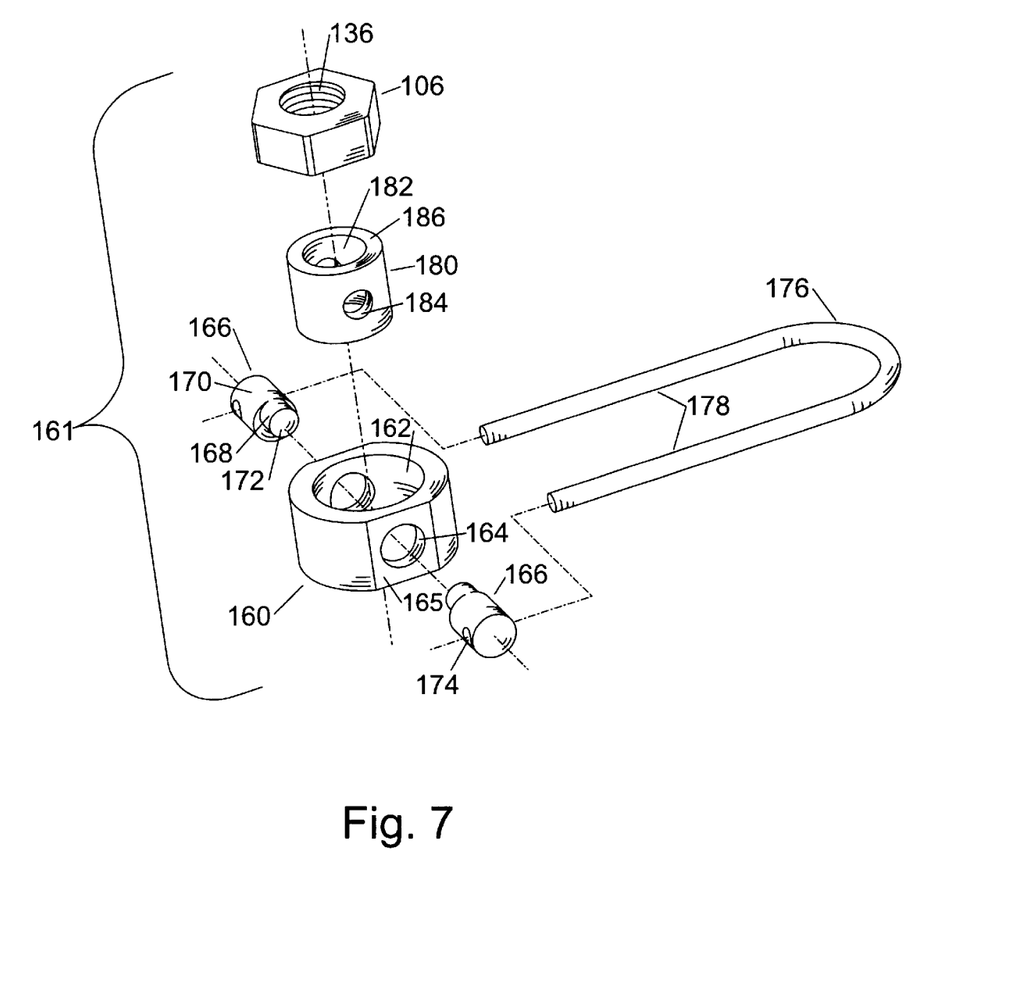
FIG. 7 shows an exploded perspective view of a concentric form of the quick release.

Description—FIG. 7

FIG. 7 shows an exploded view of a fourth quick release embodiment. A concentric quick release 161 is shown with a support ring 160 having a central bore 162 and a pair of coaxial transverse holes 164. A lifting ring 180 has a central bore 182 and a pair of coaxial transverse holes 184. A U shaped handle 176 has a pair of parallel arms 178. A pair of cam pins 166 each has a pair of offset circular cam surfaces 168 and 170, a transverse hole 174, and an inner end 172.

Inner cam surfaces 168 fit slideably into holes 184 in lifting ring 180. Outer cam surfaces 170 fit slideably into holes 164 in support ring 160. Ends of handle arms 178 are press fit through corresponding holes 174 in cam pins 166. Optionally, ends 172 of cam pins 166 may be permanently installed by heading or riveting once inside bore 182 of lifting ring 180.

Nut 106 with threaded interior bore 136 rests on a top surface 186 of lifting ring 180. A pair of optional flats 165 on support ring 160 provide clearance for arms 178 as they pivot on pins 166.

Central clearance bore 182 in lifting ring 180 is sized for loose clearance over shaft to be clamped. Central bore 162 in support ring 160 is sized for clearance of the outer circumference of lifting ring 180 with additional clearance for sideways motion due to the operation of the cams. Optionally, central bore 162 may be rink shaped, with two semicircular ends joined by short straight sides, the straight sides being parallel to flats 165. Holes 164 and 184 are aligned such that the top surface 186 of lifting ring 160 and the top surface of support ring 160 are approximately parallel when the cams are in the unclamped position.

Figure 8:
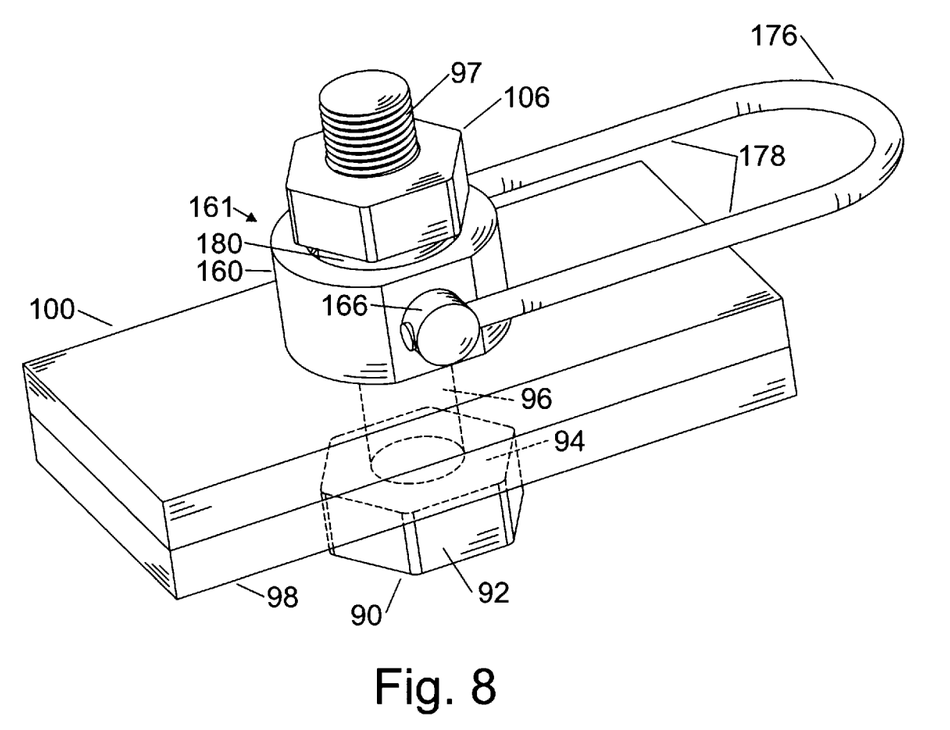
FIG. 8 shows an assembled view of the quick release of FIG. 7.

Description—FIG. 8

FIG. 8 shows quick release mechanism 161 in use clamping a set of plates. Bolt 90 with head 92 and shaft 96 passes through plates to be clamped 98 and 100, through lifting ring 180, and is threadably received by nut 106. Support ring 160 surrounds lifting ring 180. Cam pins 166 pass through holes in support ring 160 and into holes in lifting ring 180. Ends of arms 178 of handle 176 are press fit transversely through outer ends of cam pins 166. Nut 106 is threaded onto shaft 96. Threaded end 97 of shaft 96 extends upwards past nut 106. Clamping face 94 of bolt 90 acts on the bottom surface of plate 98.

The parts of the quick release mechanism shown in FIGS. 7 and 8 may be made of any material of the required strength. Metals such as steels are preferred, but other materials may be used. Appropriate materials or coatings must be selected for the surfaces of cams 168 and 170 to provide long life and reduce friction.

Cam pins 166 are preferably made with cams of the offset circular type. This allows the pins 166 and rings 160 and 180 to be easily manufactured, as only round shapes and holes are required. The preferred relative orientation of handle 176 and cam surfaces 168 and 170 is such that the cams reach their point of maximum lift just before handle 176 is again parallel with the surface to be clamped. This produces a slight relaxation after maximum lift, providing a reassuring breakover feel into the clamped position.

The distance between handle arms 178 is selected so that nut 106 may be rotated to any position and handle arms 178 may be pivoted about pins 166 without ever contacting nut 106.

Operation—FIGS. 7 and 8

The quick release 161 operates as follows: the quick release mechanism is slipped over the shaft to be clamped. Nut 106 or other adjustment/retaining means is then attached to the end of the shaft to be clamped and adjusted to touch or nearly touch the top surface 186 of lifting ring 180. Optionally, nut 106 and support ring 160 may be selected so that nut 106 is screwed down finger tight onto the upper surface of support ring 160, leaving lifting ring 180 recessed the necessary amount for proper clamping.

Handle 176 is oriented as desired around shaft 96, then pivoted closed along with cam pins 166. Offset surfaces 168 and 170 cause lifting ring 180 to move upwards and support ring 160 to move downwards. This causes support ring 160 to bear on top surface of plate 100 and top surface 186 of lifting ring to bear on the bottom surface of nut 106. Nut 106 is threadably engaged to shaft 96, tensioning bolt 90, causing clamping surface 94 of bolt head 92 to squeeze and clamp plates 98 and 100 together.

The primary benefits of this embodiment are:

(a) Self contained construction. All parts of quick release are permanently held together, so user simply drops quick release onto shaft to be clamped, threads on nut, and clamps quick release.

(b) Low height.

(c) Simple parts. All parts are readily and easily made.

(d) Handle rotates around shaft independently of adjustment means.

(e) Handle may be made to clear long shaft extensions.

(f) Interior of shaft to be clamped is not affected.

(g) Handle cannot be improperly used a wrench or crank.

(h) Outer surface of support ring 160 is well suited for marking or labeling.

Alternative embodiments include threading the interior of bore 182 for use with very short shaft extensions, though this would create an interaction between the direction of handle throw and the adjustment means. Holes 184 could be replaced by horizontal slots to reduce this interaction. Nut 106 could be replaced with a nut similar to nut 150 shown in FIGS. 5 and 6 to allow use with short shaft extensions. Also, lifting ring 180 could be replaced by a washer or even eliminated, with some increase in the stress found in pins 166.

Figure 9:
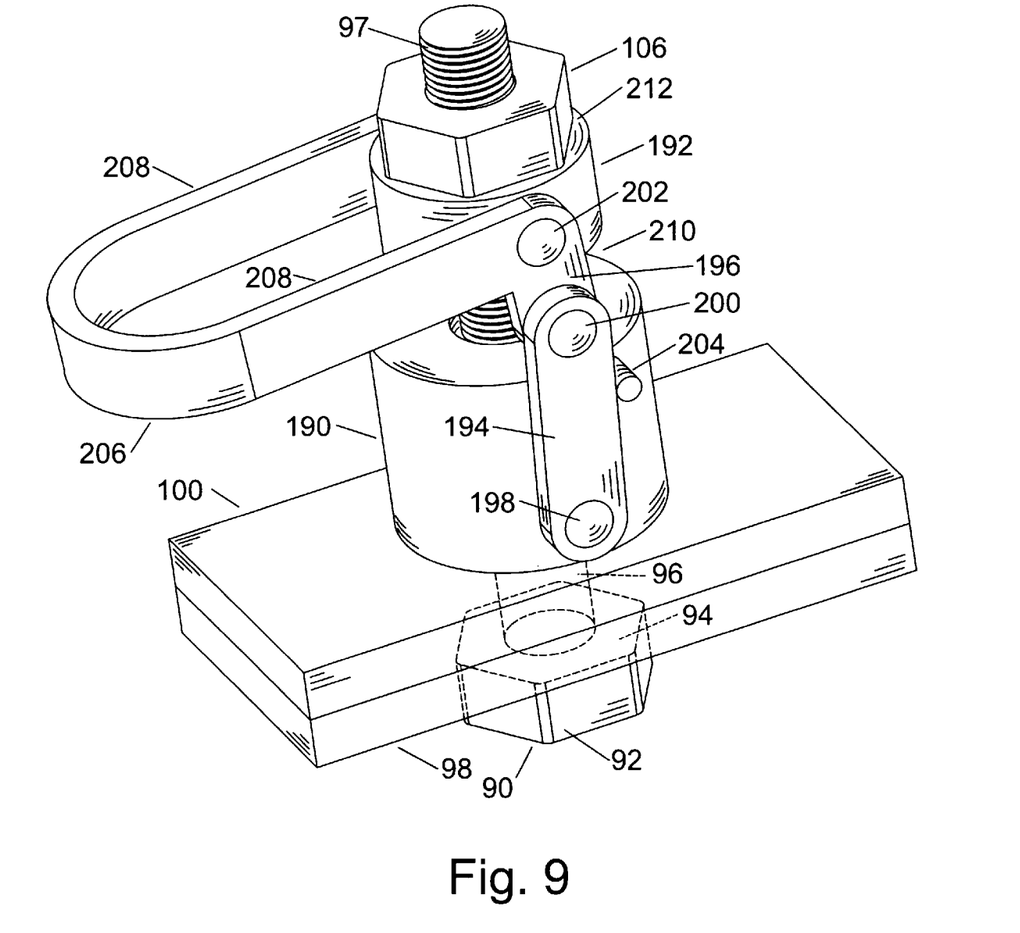

Description—FIG. 9

FIG. 9 shows a linkage type quick release in use clamping a pair of plates. Bolt 90 has head 92 and shaft 96. Shaft 96 passes through holes in plates to be clamped 98 and 100. A quick release mechanism with a support ring 190 and a lifting ring 192 is placed on shaft 96 with bottom surface of support ring 190 in contact with the top surface of plate 100. Nut 106 is threadably engaged on shaft 96 with the bottom surface of nut 106 in contact with a top surface 212 of lifting ring 192. Clamping surface 94 of bolt 90 is in contact with the bottom of plate 98. Threaded portion 97 of shaft 96 is shown extending up past nut 106.

A symmetrically located pair of links 194 are pivotably connected to support ring 190 by a pair of pivot pins 198. A handle 206 has a pair of arms 208 each having a link portion 196 pivotably connected to links 194 by a pair of pivot pins 200. Handle 206 is pivotably connected to lifting ring 192 by a pair of horizontally opposed pivot pins 202. A pair of symmetrically located restraint pins 204 prevents movement of links 194 in one direction past a preselected point.

Pins 198, 200, and 202 are preferably press fit or riveted in place, permanently connecting support ring 190, handle 206, and lifting ring 192. A gap 210 is created between support ring 190 and lifting ring 192 when handle 206 is in the clamped position as shown.

The parts of the quick release mechanism shown in FIG. 9 may be made of any material of the required strength. Metals such as steels are preferred, but other materials may be used.

Support ring 190 and lifting ring 192 are sized to fit slideably over shaft 96. The spacing between handle arms 208 is selected to clear nut 106 with nut 106 in any orientation. Length of handle arms 208 is selected for the desired leverage and to clear any extension 97 of shaft 96 above nut 106. The maximum size of gap 210 is selected to be larger than the distance between pins 200 and 202, to allow handle 206 to pivot 180 degrees or more about pins 202. Links 194 are likewise selected to have a length slightly more than double the distance between pins 200 and 202, to allow handle 206 to pivot 180 degrees or more. Preferably, handle 206 is approximately parallel to plate 100 at the maximum point of gap 210.

Operation—FIG. 9

The quick release embodiment of FIG. 9 operates as follows: the quick release is slipped over the shaft to be clamped and handle 206 is brought close to the clamped position. Nut 106 or other adjustment/retaining means is then attached to the end of the shaft to be clamped and adjusted to touch or nearly touch the top surface 212 of lifting ring 192. Handle 206 is then rotated about shaft 96 to the desired starting position and pivoted around pins 202 to the clamped position.

As handle 206 is pivoted about pins 202, inkage arm 196 and 194 cooperate to raise and lower lifting ring 192 relative to support ring 190. The point at which the maximum gap 210 is formed between support ring 190 and the bottom of lifting ring 192 is when pins 198, 200, and 202 are in a straight line. Just past this point, restraint pin 204 prevents further motion of link 194, locking the quick release in the clamped position. This provides a breakover feel which is very obvious to the operator.

As handle 206 is operated and the linkage increases gap 210, support ring 190 is forced down onto plate 100 and top surface 212 of lifting ring 192 is forced up onto the bottom surface of nut 106. Nut 106 is threadably engaged with shaft 96, tensioning bolt 90 and causing clamping surface 94 of bolt head 92 to squeeze and clamp plates 98 and 100 together. Of course, in the opposite direction, gap 210 decreases as lifting ring 192 is carried down towards support ring 190. Operating handle 206 in the releasing direction reverses the movements of ring 192.

The primary benefits of this embodiment are:
(a) Self contained construction. All parts of quick release are permanently held together, so user simply drops quick release onto shaft to be clamped, threads on nut, and clamps quick release.
(b) Over center linkage produces high clamping forces.
(c) Simple parts. All parts are readily and easily made.
(d) Handle rotates around shaft independently of adjustment means, so the direction of throw can be chosen independently of the clamping adjustment.
(e) Handle arms may be made to clear long shaft extensions.
(f) Over center linkage is less susceptible to problems with dirt than cam mechanisms.
(g) Interior of shaft to be clamped is not affected.
(h) Handle cannot be improperly used a wrench or crank.
(I) Outer surface of support ring 190 is well suited for marking or labeling.

Conclusions, Ramifications, and Scope

Accordingly, the reader will see that the retrofittable quick release embodiments of this invention can be used to easily replace existing fasteners in many applications. Since the mechanisms are self contained, and provide for independent adjustment of clamping and handle throw direction, they are more easily used and retrofitted than the prior art. Both long and short shaft extensions can be accommodated as well as other uses of the interior of the shaft to be clamped. Since the handles rotate around the shaft independent of adjustment, they cannot be improperly used as cranks or wrenches. Placing the adjustment means on the same end of the shaft as the operating handle ensures the adjustment means is always easy to reach.

Although the description above contains many specificities, these should not be construed as limiting the scope of the invention but as merely providing illustrations of some of the presently preferred embodiments of this invention. For example, shafts are shown as threaded for simplicity and because such shafts are common, but threading is not necessary for the operation of the invention. Likewise, the cams and handles are shown formed in several ways, but other equivalent arrangements would suffice. Cam follower grooves are shown in several embodiments, and these are preferred, but not necessary. Threaded nuts are shown, but knobs or rings or other equivalent things will work as well. Of course, parts shown acting upwards may act downwards, etc. with simliar effect. Finally, one possible use of the interior of the clamped shaft is shown, but there are others.

Thus, the scope of the invention should be determined by the appended claims and their legal equivalents, rather than by the examples given.

I claim:

1. A quick release clamp for tensioning a shaft, comprising:
    (a) a support ring,
    (b) a lifting ring,
    (c) a lifting means pivotably connected to said lifting ring,
    (d) a handle connected to said lifting means for operating said lifting means,
    (e) said lifting means adapted for urging said lifting ring away from said support ring,
    (f) an adjustment means adapted to retain said lifting ring,
    (g) an elongated carrier means having a first hollow end internally threaded to be adapted for attachment to the shaft,
    (h) said carrier means having a second end adapted for attachment to said adjustment means,
    (i) said support ring mounted on said carrier near said first end of said carrier,
    (j) said lifting ring mounted on said carrier means intermediate said support ring and said second end of said carrier, and (k) said adjustment means attached to said carrier means at said second end of said carrier, whereby said quick release clamp may be attached to the shaft as a unit and the shaft tensioned.

2. The quick release clamp of claim 1 wherein said support ring is positively retained on said carrier, making said quick release clamp into a self contained unit independent of the shaft.

3. The quick release clamp of claim 1 where said lifting means includes a cam.

4. The quick release clamp of claim 3 wherein said cam is of the spiral type.

5. The quick release clamp of claim 3 wherein said cam is of the offset circular type.

6. The quick release clamp of claim 1 wherein said attachment of said adjustment means to said carrier is substantially rigid, and tension adjustment is made by rotating said carrier on the shaft via said adjustment means.

7. The quick release clamp of claim 1 wherein said quick release clamp provides surfaces that cooperate with an existing use of the interior of the shaft, whereby said quick release clamp does not interfere with the existing use.

8. The quick release clamp of claim 1 wherein said handle is adapted to clear a mechanism extending axially from the interior of the shaft.

9. The quick release clamp of claim 1 wherein said support ring is adapted to have a smaller width near said first end of said carrier, whereby said support ring will be less likely to interfere with other objects in the vicinity.

10. The quick release clamp of claim 1 wherein said lifting means is located beyond said end of the shaft, whereby said lifting means may be adapted to have a smaller width.

11. A quick release clamp for tensioning a shaft extending through a clamping surface, comprising:

(a) a carrier having one end being internally threaded for mounting to an end of the shaft, (b) an adjustment ring attached to the other end of said carrier, (c) a lifting ring journaled onto said carrier inboard of said adjustment ring, (d) a lifting means pivotably mounted to said lifting ring, having a pivot axis substantially perpendicular to said carrier, (e) a handle attached to said lifting means, and (f) a support ring, mounted on said carrier inboard of said lifting means, whereby said quick release clamp may be attached to the shaft as a unit and the shaft tensioned.

12. The quick release clamp of claim 11 wherein said support ring is positively retained on said carrier, making said quick release clamp into a self contained unit independent of the shaft.

13. The quick release clamp of claim 11 wherein said lifting means includes a cam.

14. The quick release clamp of claim 11 wherein said attachment of said adjustment ring to said carrier is substantially rigid, said mounting of said carrier to the shaft is threaded, and tension adjustment is made by rotating said carrier on the shaft via said adjustment ring.

15. The quick release clamp of claim 11 wherein said quick release clamp provides surfaces that cooperate with an existing use of the interior of the shaft, whereby said quick release clamp does not interfere with the existing use.

16. The quick release clamp of claim 11 wherein said handle is adapted to clear a mechanism extending axially from the interior of the shaft.

17. The quick release clamp of claim 11 wherein said support ring is adapted to have a smaller width near the clamping surface, whereby said support ring will be less likely to interfere with other objects in the vicinity.

18. The quick release clamp of claim 11 wherein said lifting means is located beyond said end of the shaft, whereby said lifting means may be adapted to have a smaller width.

\* \* \* \* \*